United States Patent
Turbish

(10) Patent No.: US 7,600,797 B2
(45) Date of Patent: Oct. 13, 2009

(54) REMOTE CONTROLLED PICK-UP DEVICE

(76) Inventor: Mark Turbish, 309 Skylark Dr., Moon Township, PA (US) 15108

( * ) Notice: Subject to any disclaimer, the term of this patent is extended or adjusted under 35 U.S.C. 154(b) by 300 days.

(21) Appl. No.: 11/529,191

(22) Filed: Sep. 28, 2006

(65) Prior Publication Data

US 2007/0069539 A1 Mar. 29, 2007

Related U.S. Application Data

(60) Provisional application No. 60/721,453, filed on Sep. 28, 2005.

(51) Int. Cl.
*B25J 1/00* (2006.01)
(52) U.S. Cl. .................. 294/100; 294/1.1; 294/905
(58) Field of Classification Search ............ 294/1.1, 294/66.1, 100, 115, 905
See application file for complete search history.

(56) References Cited

U.S. PATENT DOCUMENTS

| | | | | |
|---|---|---|---|---|
| 2,594,908 A | * | 4/1952 | Gaulke et al. | 294/86.14 |
| 3,310,335 A | * | 3/1967 | Shuey | 294/88 |
| 3,540,770 A | | 11/1970 | Mitchell | |
| 3,633,960 A | | 1/1972 | Drayton | |
| 3,655,232 A | * | 4/1972 | Martelee | 294/67.33 |
| 4,253,697 A | * | 3/1981 | Acosta | 294/115 |
| 4,526,413 A | * | 7/1985 | Williams | 294/88 |
| 4,573,725 A | * | 3/1986 | Griffiths | 294/82.28 |
| 5,120,099 A | * | 6/1992 | Fletcher | 294/66.1 |
| 5,348,359 A | | 9/1994 | Boozer | |
| 5,377,439 A | | 1/1995 | Roos et al. | |
| 5,413,454 A | * | 5/1995 | Movsesian | 414/729 |
| 6,315,340 B1 | * | 11/2001 | Chen | 294/24 |
| 6,681,676 B2 | | 1/2004 | Hayes et al. | |

FOREIGN PATENT DOCUMENTS

| FR | 2535536 | 5/1984 |
|---|---|---|
| FR | 2578107 | 8/1986 |

* cited by examiner

*Primary Examiner*—Dean J Kramer
(74) *Attorney, Agent, or Firm*—Ference & Associates LLC

(57) ABSTRACT

A remote controlled pick-up device adapted for use by individuals from elevated positions, examples of which include, e.g., a hunter position in a tree stand, a worker on a scaffold or roof, or a police officer or fireman retrieving an object from a storm drain. The device is operated remotely from any desired elevation, enabling the operator to grip or otherwise manipulate objects or articles that are located at a different (e.g., lower) position in order to retrieve or otherwise reposition them as so desired.

11 Claims, 5 Drawing Sheets

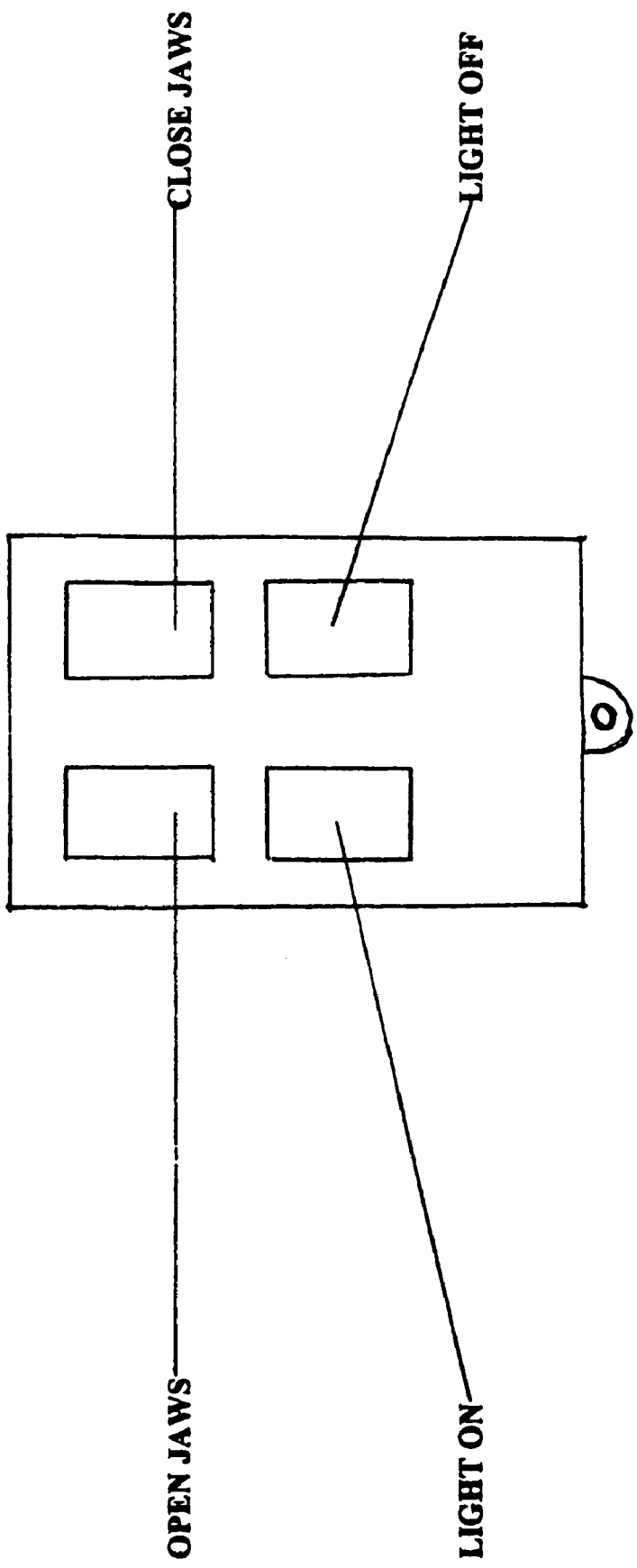

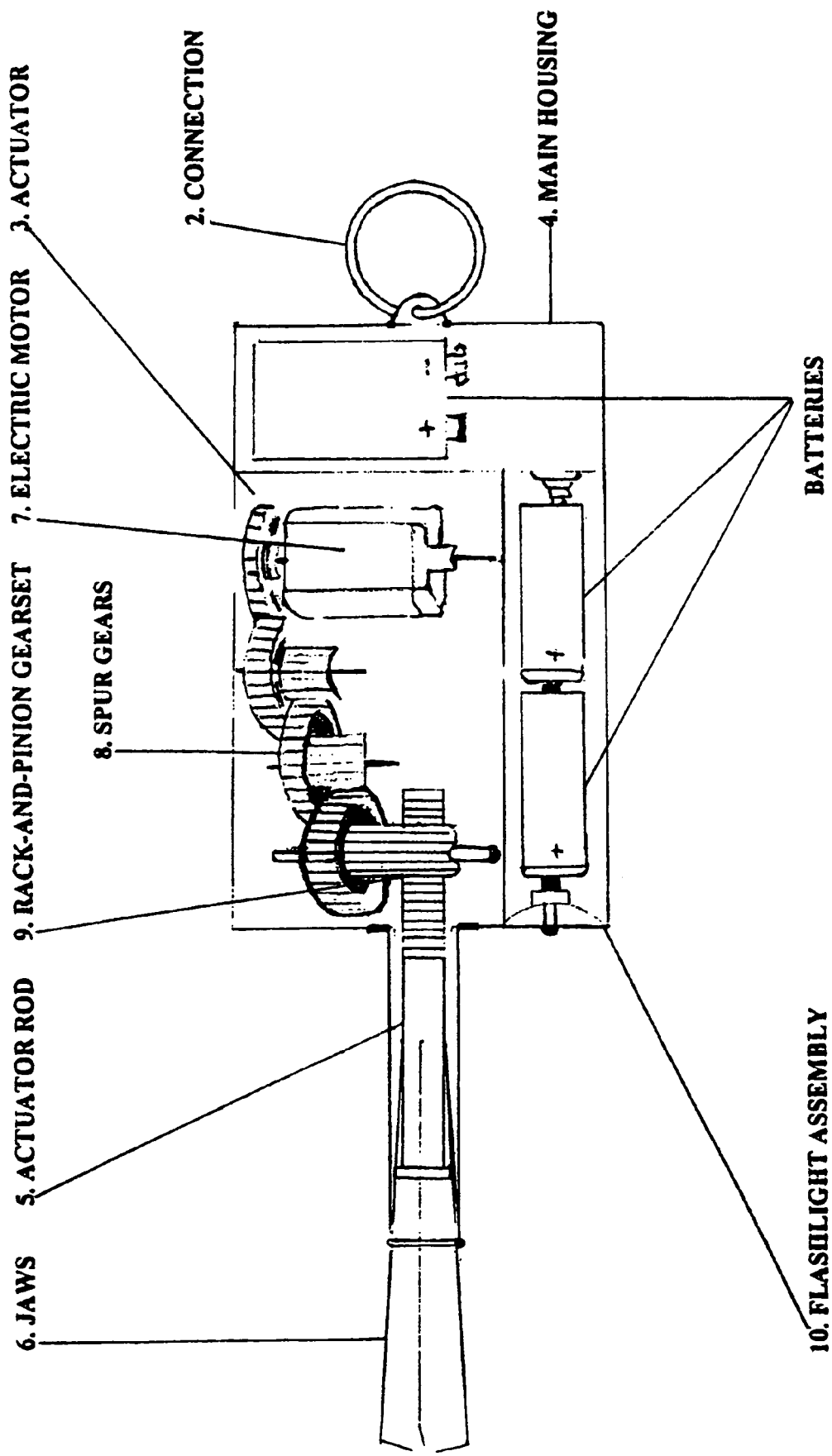
FIGURE B

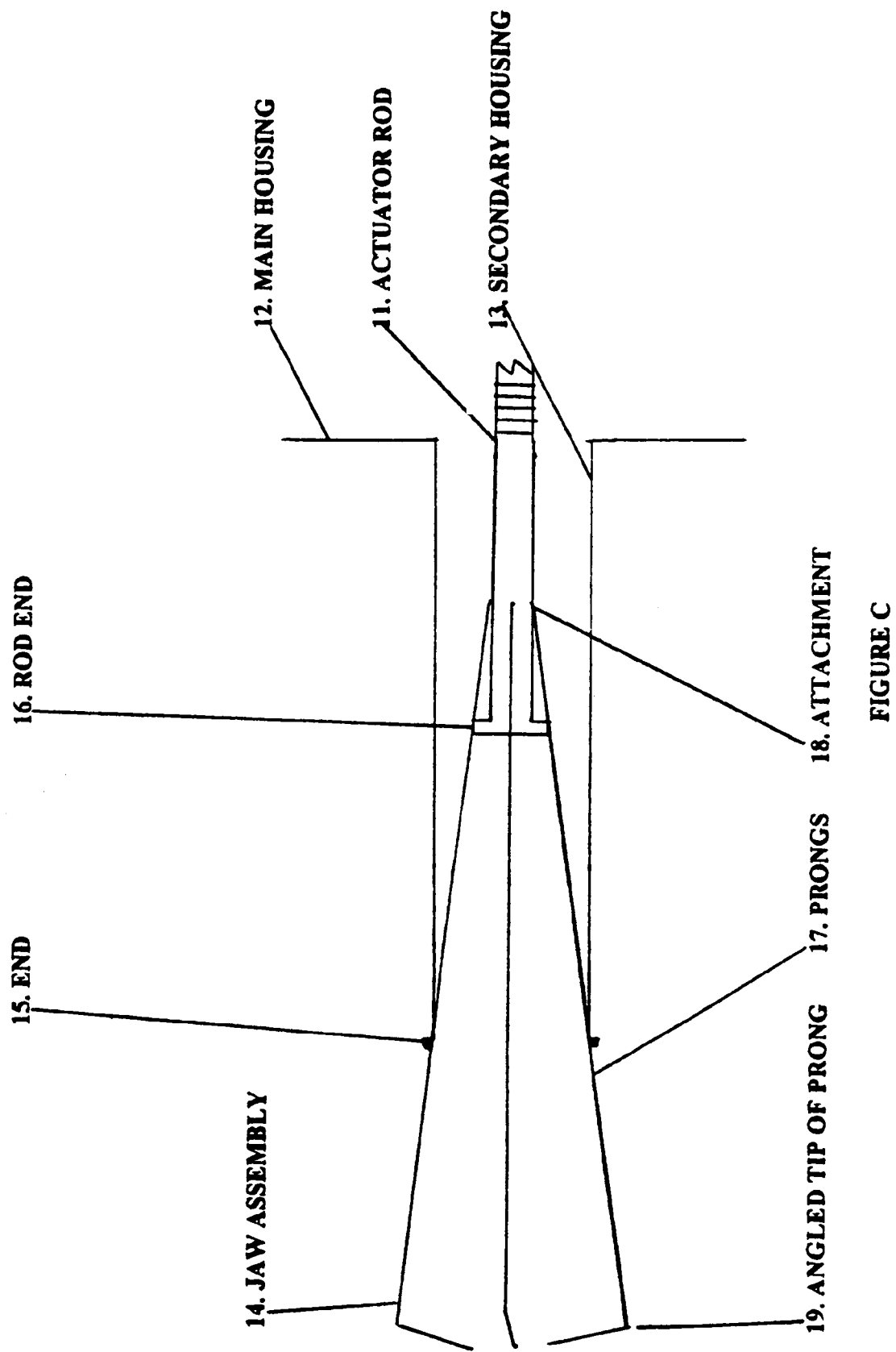
FIGURE C

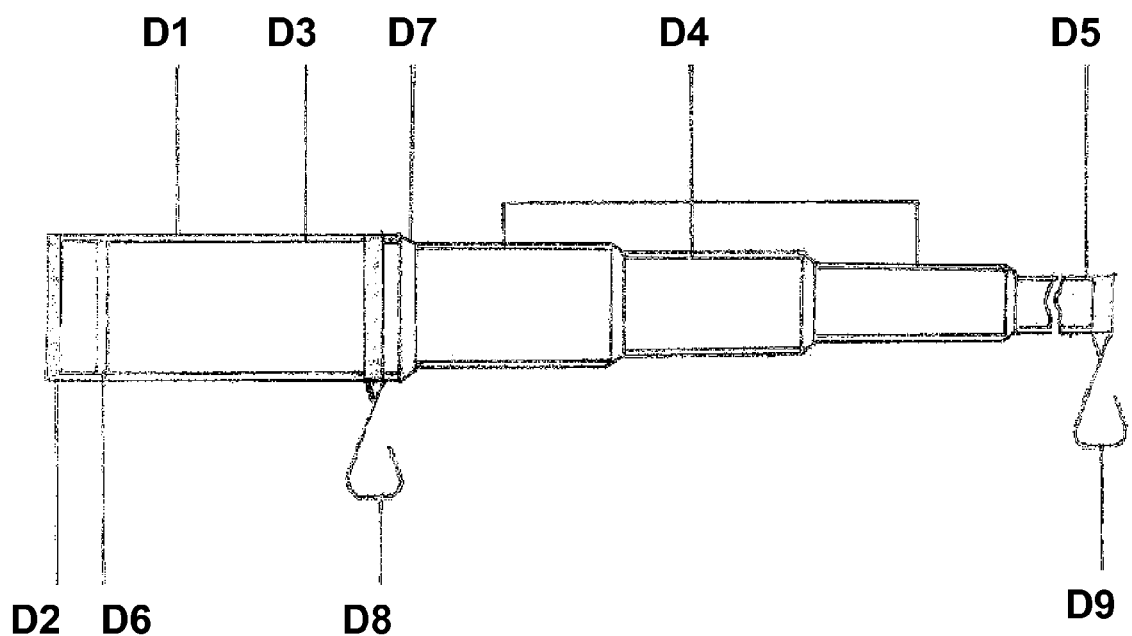
FIGURE D

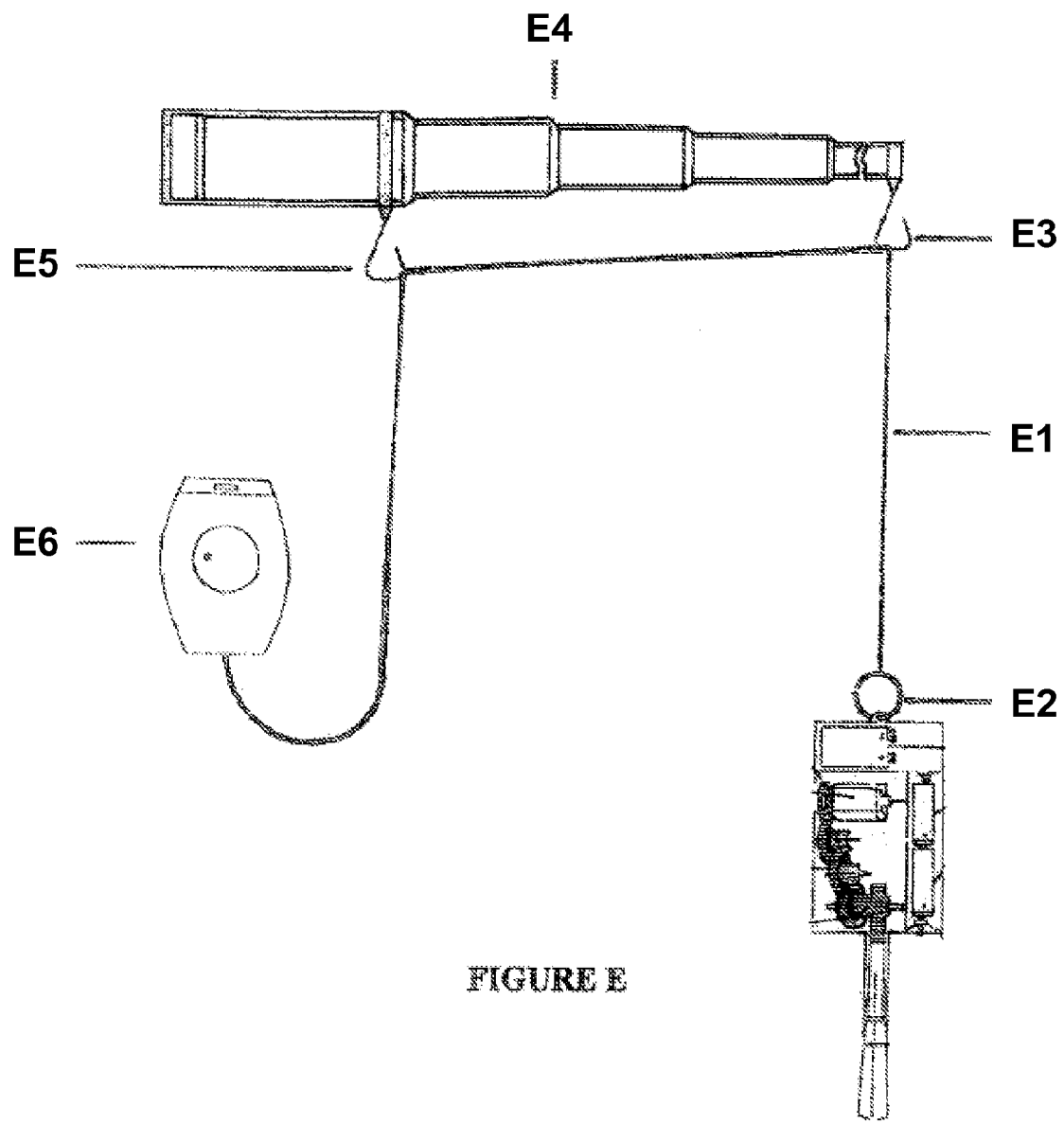
FIGURE E

REMOTE CONTROLLED PICK-UP DEVICE

CLAIM FOR PRIORITY

This application claims priority from U.S. Provisional Patent Application Ser. No. 60/721,453 filed on Sep. 28, 2005, which is hereby fully incorporated by reference as if set forth in its entirety herein.

FIELD OF THE INVENTION

The present invention relates generally to pick-up devices and, more particularly, to an improved pick-up device, which is adapted to applications from extended ranges.

BACKGROUND OF THE INVENTION

Many individuals enjoy hobbies such as hunting and wildlife photography, which may require them to position themselves on elevated platforms such as tree stands. Others may have occupations, which may require them to work from an elevated position such as a scaffold or rooftop. These types of circumstances make it difficult, if not impossible, to gasp and/or manipulate out-of-reach objects or articles that may have fallen to the ground, forgotten prior to initial ascent, intentionally left on the ground for safety reasons until an individual has secured themselves in their elevated position, or stored on the ground due to lack of space until their use is required. Consequently, many individuals could benefit greatly from a remote controlled pick-up device capable of extended range applications and adapted for gripping or otherwise manipulating objects or articles. Various pick-up devices and related implements are known, however, they suffer from one or more drawbacks and/or limitations. A common disadvantage of existing pick-up devices are their relatively limited range of reach, typically only a couple of feet. Another disadvantage of many existing pick-up devices is that they are of one-piece construction and designed for relatively close range applications that does not lend itself to the more versatile use required for extended multiple elevation and/or range changes. This one piece construction greatly reduces or eliminates the practicality of compactness and versatility required by extended range applications. Consequently, application from a twenty foot elevation example, would require a one piece device to be of that exact length resulting in the inability to use from any other elevation, unreasonable prefabrication, manufacturing complexity and cost, weight, shipment, storage, and maneuverability during operation.

Accordingly, a need has been recognized in connection with effecting improvements over existing pick-up devices and overcoming their disadvantages and limitations.

SUMMARY OF THE INVENTION

Broadly contemplated herein, in accordance with at least one presently preferred embodiment of the present invention, is a remote controlled pick-up device. The device is particularly adapted for use by individuals from elevated positions, examples of which include, e.g., a hunter position in a tree stand, a worker on a scaffold or roof, or a police officer or fireman retrieving an object from a storm drain. The device is operated remotely from any desired elevation, enabling the operator to grip or otherwise manipulate objects or articles that are located at a different (e.g., lower) position in order to retrieve or otherwise reposition them as so desired.

In summary, one aspect of the invention provides a remote grasping device comprising: a grasping arrangement; the grasping arrangement comprising a grasping element for grasping an object; and a control arrangement for remotely controlling the grasping element without any mechanical operative connection between the control arrangement and the grasping arrangement.

Furthermore, an additional aspect of the invention provides a method of remotely grasping an object, the method comprising the steps of: providing a grasping arrangement; providing a control arrangement; and grasping an object with the grasping arrangement; the grasping step comprising remotely controlling the grasping arrangement without any mechanical operative connection between the control arrangement and the grasping arrangement.

BRIEF DESCRIPTION OF THE DRAWINGS

FIG. A schematically illustrates a remote radio transmitter in accordance with an embodiment of the present invention.

FIG. B schematically illustrates an embodiment of the present invention.

FIG. C schematically illustrates a jaw assembly in accordance with an embodiment of the present invention.

FIG. D is a side view of an extension rod in the form of a telescopic fishing rod assembly in accordance with one embodiment of the invention.

FIG. E is a side view of an embodiment of the invention depicting a line attached to the swivel connection and to an extension rod and reel.

DESCRIPTION OF THE PREFERRED EMBODIMENTS

In one general aspect of the present invention, is a small battery operated remote controller/radio transmitter (FIG. A). When a button is pushed, it turns on the transmitter and sends a code to the receiver. Commands to open and close the jaws and to turn the light on and off.

In another aspect of the present invention, a swivel connection (FIG. B2) is attached at the opposite end of the main housing from the jaws (FIG. B6). The purpose of the swivel connection is that of attaching a cable or line to the device for retrieval and/or manipulation of the device. The end user may attach any aforementioned cable or line adapted to their own particular needs and/or requirements regarding, but not limited to, strength, safety, length, flexibility, size, color, or composition. Additionally, any aforementioned cable or line may be connected to any type of extension rod or telescoping rod (example: a fishing rod and reel design) for the purpose of extending the operators horizontal reach in addition to present inventions vertical applications. In another aspect of the present invention, a battery powered actuator (FIG. B3) is captivated with an interior space of the main housing (FIG. B4). This main housing construction can be formed with integrally molded structural support and attachment features to secure the movable components in place.

In another aspect of the present invention, radio frequencies are monitored for the correct code from the remote radio transmitter (FIG. A). When the correct code is received, to open the jaws (FIG. B6), it provides power to the actuator (FIG. B3). A small electric motor (FIG. B7) turns a series of spur gears (FIG. B8) that serve as a gear reduction. The last gear drives a rack-and-pinion gear set (FIG. B9) that is the gear end of the actuator rod (FIG. B5). The rack converts the rotational motion of the motor into the linear motion needed to move the actuator rod (FIG. B5) in a direction away from the actuator (FIG. B3) and towards the cooperating jaws (FIG. B6) resulting in their opening in order to grasp an object there between. When the correct code is received to close the jaws, this series of events is reversed resulting in the actuator rod (FIG. B5) moving toward the actuator (FIG. B3) and way from the cooperating jaws (FIG. B6) thus drawing the jaw assembly (FIG. C14) into the secondary housing (FIG. C13) resulting in the constriction and closing together the jaws (FIG. B6) resulting in the jaw assembly (FIG. C14) closing and securely grasping an object there between.

In another aspect if the present invention, the actuator rod (FIG. C11) protrudes through the end of the main housing (FIG. C12) into a secondary housing (FIG. C13), generally comprising an elongated shank adapted for a moveable actuator rod (FIG. C11) with cooperating jaw attachments (FIG. C18) that extend beyond the object-grasping and manipulating end (FIG. C15). An operational space is maintained between this housing to accommodate the actuator rod (FIG. C11) and the cooperating jaw attachments (FIG. C18) facilitating transfer of the linear motion of the actuating rod (FIG. C11) assisting in the opening and closing action of the cooperating jaw assembly (FIG. C14) while transitioning through the object grasping and manipulation end of the secondary housing (FIG. C15).

In another aspect of the present invention, the actuator rod end (FIG. C16) is proportionally larger than the remaining actuator rod (FIG. C11) maintaining the angle of the attached cooperating jaw prongs (FIG. C17). The cooperating jaw claws are attached (FIG. C18) to the actuator rod (FIG. C11) inward of its end (FIG. C11) extending outward on angle through and past the grasping and manipulation end of the secondary housing (FIG. C15) so as to maintain an open spacing when the actuator rod (FIG. C11) is in the extended open position, a direction away from the actuator (FIG. B3). When the actuator rod (FIG. C11) moves toward the actuator (FIG. B3), the closed position, the individual prongs (FIG. C17) of the cooperating jaw assembly (FIG. C14) are forced together as they are drawn back into the secondary housing (FIG. C13) resulting in a reduction of prong spacing restricted by the secondary housing wall (FIG. C13) thus eliminating spacing between the individual prongs (FIG. C17) of the cooperating jaw assembly (FIG. C14) resulting in its closing assisted in conjunction with the angulations of the tips of the prong (FIG. C 19).

In another aspect of the present invention, a remote controlled flashlight mechanism. (FIG. B10). The flashlight is turned on and off from the remote control (Fig. A) to emit a ray of light which will illuminate the work area where the remote controlled pick-up device is being operated. The flashlight can be operated independently.

Referring in more detail to the drawing illustrated in FIG. D is a preferred form of extension rod recognizable to those skilled in the art as a form of telescopic fishing assembly. The size and length of said extension rod is expressed by the plurality of conventional intermediate sections suitably consistent with end and tip sections respectively. Said extension rod is broadly comprised of an elongated hollow tubular handle (D1) with end cap (D2). A plurality of rod sections may suitably consist of a larger butt end section (D3), intermediate sections (D4), and a tip section (D5). Each rod section, also hollow tubular in configuration in accordance with the tubular handle (D1), gradually reduces in their inner diameters such that the innermost butt end section (D3) has the largest diameter, and the outermost tip section (D5) has the smallest diameter and are so dimensioned that adjacent sections are inter-fitted within the other when retracted. Conversely, when extended, the leading end's beveled collar (D7) of a larger section will frictionally engage the trailing rib end (D6) of a next larger section in accordance with conventional practice. The handle (FIG. D1) has a line guide (D8) at its leading end, and the tip section (D5) has a tip end line guide (D9).

As shown in FIG. E, a line (E1) connects to the swivel connection (E2) extending vertically upward until passing through the tip end line guide (E3) of said extension rod (E4) continuing horizontally back passing through the handle line guide (E5) continuing to said reel (E6). As previously mentioned in the description, said reel may or may not be attached to said extension rod.

Since many modifications, variations, and changes in detail can be made to the described preferred embodiments of the invention, it is intended that all matters in the foregoing description and shown in the accompanying drawings be interpreted as illustrative and not in a limiting sense. Thus, the scope of the invention should be determined by the claims and their legal equivalence.

What is claimed is:

1. A remote grasping device comprising:
    a grasping arrangement;
    said grasping arrangement comprising a grasping element for grasping an object;
    a swivel connection for attaching a line to the grasping device, said line being adapted to lower and retrieve said grasping device; and
    a control arrangement for remotely controlling said grasping element without any mechanical operative connection between said control arrangement and said grasping arrangement;
    wherein said remote grasping device is adapted for use by an individual from an elevated position;
    wherein said grasping arrangement further comprises an actuator for actuating said grasping element;
    wherein said actuator comprises a linear actuation element for selectively actuating opening and closing of said grasping element;
    wherein said grasping element comprises cooperating jaws; and
    wherein:
    said actuator comprises a rack and pinion arrangement; and
    said linear actuator element comprises an actuator rod which is linearly displaceable via said rack and pinion arrangement.

2. The device according to claim 1, wherein said actuator rod acts to spread said jaws when displaced in a first linear direction and to close said jaws when displaced in a second linear direction which is opposite to the first linear direction.

3. The device according to claim 1, wherein said grasping arrangement comprises a self-contained power source for powering said actuator.

4. The device according to claim 1, wherein said grasping arrangement comprises a light source for illuminating an object to be grasped.

5. The device according to claim 1, wherein said control arrangement acts to issue at least one of the following commands:
    open a grasping element of said grasping arrangement;
    close a grasping element of said grasping arrangement;
    turn on a light source of said grasping arrangement; and
    turn off a light source of said grasping arrangement.

6. The device according to claim 5, wherein said control arrangement acts to selectively issue all of the following commands:
    open a grasping element of said grasping arrangement;
    close a grasping element of said grasping arrangement;

turn on a light source of said grasping arrangement; and
turn off a light source of said grasping arrangement.

7. The device according to claim 1, wherein said control arrangement comprises a radio transmitter.

8. The device according to claim 1, wherein said grasping arrangement comprises a receiver for receiving commands from said control arrangement.

9. The device according to claim 1, wherein said control arrangement acts to control said grasping arrangement via coded commands.

10. A remote grasping device comprising:
a grasping arrangement;
said grasping arrangement comprising a grasping element for grasping an object;
a swivel connection for attaching a line to the grasping device, said line being adapted to lower and retrieve said grasping device; and
a control arrangement for remotely controlling said grasping element without any mechanical operative connection between said control arrangement and said grasping arrangement;
wherein said remote grasping device is adapted for use by an individual from an elevated position;
wherein said swivel connection for attaching a line to said grasping device accommodates attachment of a line suitable for use with a telescoping rod; and
wherein said telescoping rod comprises a fishing rod and reel.

11. A remote grasping device comprising:
an extension rod suitably adapted for hand held use;
a grasping arrangement;
said grasping arrangement comprising a grasping element for grasping an object;
a swivel connection for attaching a line to the grasping arrangement, wherein the line connects the extension rod and the grasping arrangement; and
a control arrangement for remotely controlling said grasping element without any mechanical operative connection between said control arrangement and said grasping arrangement;
wherein said remote grasping device is adapted for retrieving or repositioning an object by an individual from an elevated position; and
wherein said extension rod acts to extend a horizontal reach of an operator of said remote grasping device.

* * * * *